H. E. COFFIN.
ADVERTISING SIGN.
APPLICATION FILED OCT. 29, 1908.
933,531.
Patented Sept. 7, 1909.
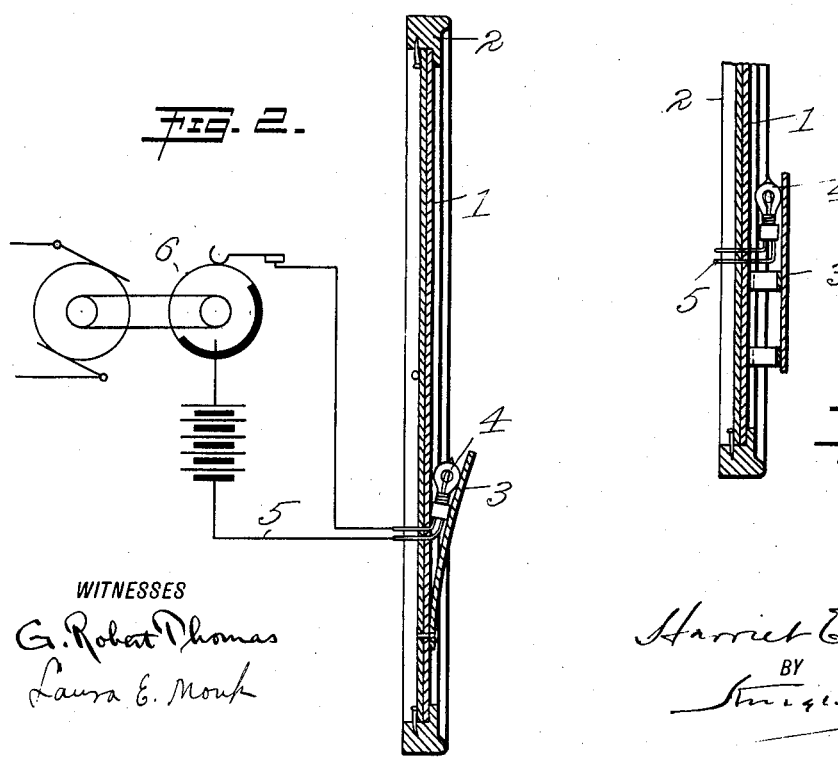
WITNESSES
INVENTOR
Harriet E. Coffin
BY
ATTORNEYS

UNITED STATES PATENT OFFICE.

HARRIET E. COFFIN, OF NEW YORK, N. Y.

ADVERTISING-SIGN.

933,531. Specification of Letters Patent. Patented Sept. 7, 1909.

Application filed October 29, 1908. Serial No. 460,073.

*To all whom it may concern:*

Be it known that I, HARRIET E. COFFIN, a citizen of the United States, residing in the borough of Manhattan, city, county, and State of New York, have invented certain new and useful Improvements in Advertising-Signs, of which the following is a full and clear specification.

My invention relates to an advertising sign in which a pictorial representation of a figure or figures, or other objects, or a part of the same, are illuminated, preferably intermittently, the picture in itself having some relation to the matter advertised, the object of the construction being to arrange in the picture, and as a part of it, an illuminating source throwing into relief or prominence the main background or body of the picture, and the light being obscured by parts forming the foreground of the picture. To this end, I mount the parts of the picture in two planes, one forward of the other, and arrange between them a light, preferably intermittently controlled, arranged to be obscured by the forward plane and to cast its light upon the main body or rear portion of the picture.

In the accompanying drawings Figure 1 illustrates in front view a form of my invention. Fig. 2 is a sectional view thereof, the electric circuit being shown diagrammatically, and Fig. 3 is a similar view illustrating a modified form and omitting the circuit.

I have chosen to illustrate my idea, a picture which may be supposed to be used for advertising a brand of cigars, the picture illustrating a man with a cigar in his mouth and holding a match in his hand. The picture will be preferably so drawn as to receive its light from a point in rear of the hand.

Referring to Fig. 2, 1 is the main body of the picture and 2 the frame, 3 is an arm or portion arranged forward of the main body of the picture, and upon the forward part of which the hand or arm 3 of the figure (Fig. 1) is portrayed. Immediately in rear of the arm 3, I mount a source of light, preferably an electric globe in an electric circuit 5, carried through the picture to the back thereof, and controlled by a suitable switch, as for example the continuously operated intermittent switch 6. It will be observed that when the circuit is broken the entire figure will be in relative obscurity or when the circuit is completed and the lamp lighted, the light will glow behind the forwardly projecting part 3 and cast its rays upon the main body of the picture from the rear of the hand, giving the effect of the figure striking the match to light the cigar.

It is not necessary that the forwardly projecting arm or part 3 be arranged in the inclined position shown. It may, with suitable arrangement of the design, be mounted parallel or substantially so to the main body of the picture as shown in Fig. 3.

It is apparent that many changes can be made within the scope of the appended claims without departing from the invention, the particular application shown being merely illustrative.

What I claim is—

1. A display advertising apparatus comprising a pictorial representation, divided into two members, mounted in two planes but both facing in one direction, and an illuminating device mounted between the members obscured by the forward member and having its rays thrown upon the rear member.

2. A display advertising apparatus comprising a pictorial representation divided into two members, mounted in two planes, but both facing in one direction, an illuminating means disposed between the two members, and means for effecting therefrom an intermittent illumination of the representation substantially for the purpose described.

HARRIET E. COFFIN.

Witnesses:
HARRY E. KNIGHT,
LAURA E. MONK.